United States Patent Office 3,242,172
Patented Mar. 22, 1966

3,242,172
NOVEL DERIVATIVES OF 2H,8H-BENZO-[1,2-e',5,
4-e']-BIS-[1,2,4]-THIADIAZINE - 1,1,9,9 - TETRA-
OXIDE
John G. Topliss, Bloomfield, N.J., assignor to Schering
Corporation, Bloomfield, N.J., a corporation of New
Jersey
No Drawing. Filed Aug. 14, 1963, Ser. No. 301,949
9 Claims. (Cl. 260—243)

This invention relates to novel compounds having therapeutic activity and to processes for manufacturing the same.

More particularly this invention relates to novel derivatives of 2H,8H,-benzo-[1,2-e:5,4e']-bis-[1,2,4]-thiadiazine-1,1,9,9-tetraoxide which exhibit mild tranquilizing properties.

The compounds of the present invention may be represented as having the structural formula:

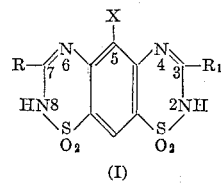

(I)

and the non-toxic alkali metal salts thereof, wherein X represents lower alkyl, and halogen, and R and $R_1$ each represent hydrogen, lower alkyl, phenyl and benzyl.

It is readily apparent to one skilled in the art to which this invention relates, that the molecules may exist in more than one tautomeric form. In one thiadiazine-1,1-dioxide moiety the double bond may exist between the 2- and the 3-position atoms, or it may exist between the 3- and 4-position atoms; in the other thiadiazine-1,1-dioxide moiety the double bond may exist between the 6- and the 7-position atoms, or it may exist between the 7- and 8-position atoms. Thus, although only one tautomeric form is depicted within this application it is to be understood that such tautomers are equivalent entities and therefore all possible tautomers are contemplated as being within the scope of this invention.

The novel compounds of this invention are useful as mild tranquilizing agents characterized by locomotor depression, ptosis, increased sleep and decreased alertness, and in their effects are suggestive of imipramine-like action. Thus, these agents may be useful in the treatment of behavioral disturbances such as those presently treated by phenothiazine tranquilizers.

The compounds can be administered in therapeutic dosages in conventional vehicles as in the form of a tablet or a capsule as these compounds are effective upon oral administration as well as upon injection. As the compounds of this invention also are readily soluble in a dilute alkaline medium or in polyethylene glycol solutions, injectable solutions can be prepared by dissolving the desired compound in the selected medium to which preservatives can be added if desired.

Exemplary of the various radicals symbolized by either X, R and $R_1$ of structural Formula I are: for lower alkyl, methyl, ethyl, n-propyl, iso-propyl, cyclopropyl and such other straight, branched and cyclized saturated lower aliphatic hydrocarbyls, as well as such equivalently-acting radicals as the halogenoalkyls such as monochloromethyl, dichloromethyl, trichloromethyl, trifluoromethyl, monochloroethyl and the like; for halogen, chlorine, bromine, fluorine, and iodine; for phenyl, and such equivalently-acting radicals as the ortho, meta, and parachlorophenyl, methoxyphenyl, methylphenyl and the like, and for benzyl, benzyl and such equivalently-acting radicals as the ortho, meta, and para-chlorobenzyl, methoxybenzyl, methylbenzyl and the like, and such other radicals as phenethyl, and the like.

In general, the compounds of this invention may be prepared from an appropriately substituted 6-amino-2H,-1,2,4-benzothiadiazine-7-sulfonamide 1,1-dioxide (II) with a reactant such as an ortho ester, $RC(OR')_3$, a carboxylic acid, RCOOH or a derivative thereof such as the corresponding acid halide, anhydride, amide and simple lower alkyl esters, or other chemically equivalent compounds which, under the reaction conditions, are convertible thereunto. For each of these reactants, R is as defined above, and R' represents lower alkyl. In these reactions all reactants are essentially equivalent in ultimately producing the end product. Thus, the reaction of 6-amino-5-methyl - 2H - 1,2,4-benzothiadiazine-7-sulfonamide-1,1-dioxide with either ethyl orthoacetate, α-methoxy-acetaldehyde diethyl acetal, acetic acid, acetyl chloride, acetic anhydride, or ethyl acetate will ultimately result in the formation of 5,7-dimethyl-2H,8H-benzo-[1,2-e:5,4-e'] - bis - [1,2,4]-thiadiazine-1,1,9,9-tetraoxide. It is understood that minor variations in reaction conditions may be necessary to effect the transformation, said variations dependent upon the nature of the reactant as set forth below.

The novel 2H,8H-benzo-[1,2-e:5,4-e']-bis-[1,2,4]-thiadiazine-1,1,9,9-tetraoxide compounds (I) are thus prepared by heating 6-amino-2H-1,2,4-benzothiadiazine-7-sulfonamide 1,1-dioxide (II) with reactants such as the above mentioned ortho esters, carboxylic acids, acid halides and acid anhydrides and acetals. When the carboxylic acids, acid halides or acid anhydrides are used as reactants, a catalyst is usually necessary in order to directly produce the appropriate 2H,8H-benzo-[1,2-e:5,-4-e']-bis-[1,2,4]-thiadiazine 1,1,9,9-tetraoxide (I) without first isolating intermediary substances, although in certain instances the product can be directly formed by heating the reactants at much higher temperatures without the use of a catalyst. When used, the catalyst may be basic, such as the alkali metal salts of the corresponding carboxylic acids, a tertiary amine such as pyridine, picoline, or lutidine, or the catalyst may be acidic in nature such as for example, perchloric acid.

When reacting the 6-amino-2H-1,2,4-benzothiadiazine-7-sulfonamide 1,1-dioxide (II) starting material with an ortho ester, the reaction is generally carried out at above room temperatures.

In the absence of a solvent, the temperature range is from about 40° C. to the boiling point of the particular ortho ester, although a temperature range of about 80–130° C. is preferred. If the reaction is carried out in the presence of an inert organic solvent, the temperature is usually maintained at about the reflux temperature of the reaction mixture. Solvents such as dioxane or dimethylene glycol dimethyl ether are preferred but other suitable non-reactive solvents may also be used.

With a carboxylic acid reactant, the reaction is preferably effected with catalysis, under pressure, and with increased temperatures in the range of about 130–200° C., although it is preferred to use temperatures between about 160° and 170° C.

With an acid halide or acid anhydride reactant, such reactant in excess is heated with the 6-amino-2H-7-sulfonamide-1,2,4-benzothiadiazine-1,1-dioxide starting material (II) in the presence of one of the above described catalysts.

The afore-described chemically equivalent preparations are illustrated as follows:

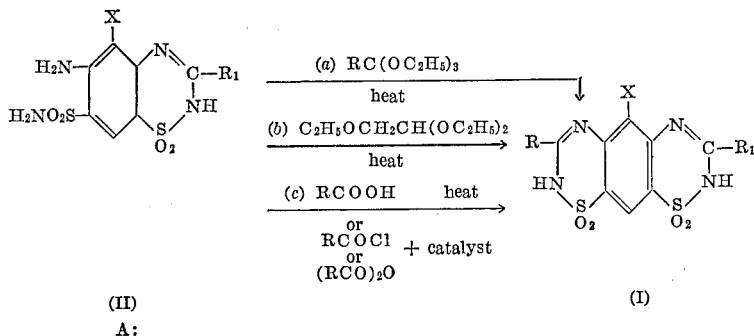

A:

In the foregoing scheme, X, R and R₁ are as hereinabove defined. The ortho ester reactant in A is shown as being an ethyl ester, however, it is understood that other common lower alkyl esters may be similarly employed without changing the final product, since the alkoxy groups are eliminated during the reaction. The acetal reactant (in A(b)) is shown as ethoxyacetaldehyde diethyl acetal. It is understood that any lower alkyl acetal may be used or any lower alkoxy group may be employed in place of the ethoxy groups depicted since these groups are eliminated during the reaction. The controlling feature of the acetal reactant is the structure of the α-carbon atom and its substituents. For example, by employing α-ethoxypropionaldehyde acetal, the product (I) would have a 3-ethyl substituent.

The substituted 6-amino-2H-1,2,4-benzothiadiazine-7-sulfonamide 1,1-dioxide starting material may be prepared by procedures set forth in the F. C. Novello U.S. Patent No. 2,910,474 with, of course, proper modification in the Novello starting materials so as to take into consideration the X-designated substituents.

For the synthesis of compounds of formula I wherein R and R₁ are the same, alternative methods are available. These methods consist in converting a 4,6-diamino-m-benzenedisulfonamide into a compound of Formula I by methods generally used in converting an o-sulfamylaniline into a 1,2,4-benzothiadiazine ring system. For example, a mixture consisting of ethyl orthoacetate and 5-chloro-4,6-diamino-m-benzenedisulfonamide in a non-reactive solvent may be heated at its reflux temperature to produce 5 - chloro - 3,7 - dimethyl-2H-8H-benzo-[1,2-e:5,4-e']-bis-[1,2,4]-thiadiazine-1,1,9,9-tetraoxide.

The preparation of the compounds embraced by formula I is more fully described in the following examples. It is to be understood, however, that the examples are illustrative of the compounds embraced by this invention and of the methods for their preparation and are, therefore, not to be construed as limiting the invention to the particular compounds or methods specifically described.

EXAMPLE 1

5-chloro-3,7-dimethyl-2H,8H-benzo-[1,2-e:5,4-e']-bis-[1,2,4]-thiadiazine-1,1,9,9-tetraoxide Heat a mixture of 9.45 g. of 4-amino-5,6-dichlorobenzene-m-disulfonamide, 250 ml. of ethanol and 50 g. of ammonia in an autoclave for 5 hours at 170–180° C. Evaporate off the solvent and the excess of ammonia and add water to the residual material. Collect the crude product by filtration, wash with water and air dry to give 6.05 g. of a discolored solid. Recrystallize from methanol to yield 4.3 g. of 5-chloro-4,6-diamino-m-benzenedisulfonamide.

Dissolve 7-1 g. of 5-chloro-4,6-diamino-m-benzenedisulfonamide in a hot mixture of 30 ml. of ethyl orthoacetate and 75 ml. of 2-methoxyethanol and reflux the resulting solution for 12 hours. Filter the cooled reaction mixture and wash the solid product with methanol and air dry to yield 5.3 g. of 5-chloro-3,7-dimethyl-2H,8H-benzo-[1,2 - e:5,4-e'] - bis-[1,2,4]-thiadiazine-1,1,9,9-tetraoxide, which is purified by recrystallization from a dimethyformamide-water mixture.

EXAMPLE 2

5,7-dimethyl-2H,8H-benzo[1,2-e:5,4-e']-bis-[1,2,4]-thiadiazine-1,1,9,9-tetraoxide Heat a mixture of 5.0 g. of 6-amino-5-methyl-2H-1,2,4-benzothiadiazine-7-sulfamide-1,1-dioxide, 50 ml. of ethyl orthoacetate and 150 ml. of 2-methoxyethanol at the reflux temperature of the reaction-mixture for 12 hours. Filter the cooled reaction mixture, wash the solid product with methanol and recrystallize from dimethylformamide-water to give 5,7-dimethyl-2H,8H-benzo-[1,2-e:5,4-e']-bis-[1,2,4]-thiadiazine-1,1,9,9-tetraoxide.

EXAMPLE 3

5-chloro-3-chloromethyl-2H,8H,benzo-[1,2-e:5,4-e']-bis-[1,2,4]-thiadiazine-1,1,9,9-tetraoxide Heat a mixture of 5.0 g. of 6-amino-5-chloro-2H,-1,2,4-benzothiadiazine-7-sulfonamide-1,1-dioxide, 50 ml. of ethyl orthochloroacetate and 150 ml. of 2-methoxyethanol at reflux temperature for 12 hours. Cool and filter the reaction mixture, wash the solid product with methanol and recrystallize the solid from dimethylformamide-water to give the product of this example.

EXAMPLE 4

3,5,7-trimethyl-2H,8H-benzo-[1,2-e:5,4-e']-bis-[1,2,4]-thiadiazine-1,1,9,9-tetraoxide Dissolve 5.0 g. of 5 methyl-4,6-diamino-m-benzenedisulfonamide in a hot mixture containing 25 ml. of ethyl orthoacetate and 75 ml. of 2-methoxyethanol, and reflux the resulting solution for 12 hours. Cool and filter the reaction mixture, wash the solid product with methanol and recrystallize from dimethylformamide-water to give the product of this example.

EXAMPLE 5

5-methyl-3-phenyl-2H,8H-benzo-[1,2-e:5,4-e']-bis-[1,2,4]-thiadiazine-1,1,9,9-tetraoxide Heat a mixture of 5.0 g. of 6-amino-5-methyl-2H-1,2,4-benzothiadiazine-7-sulfonamide-1,1-dioxide, 5.0 g. of benzoyl chloride and 50 ml. of dimethylformamide on the steam bath for 3 hours. Cool the reaction mixture, dilute with 150 ml. of water and filter off the precipitated 6-benzamido - 5 - methyl - 2H - 1,2,4-benzothiadiazine-7-sulfonamide-1,1-dioxide. Melt the latter substance and keep in the molten state for 5 minutes. Cool and recrystallize the residue from dimethylformamide-water to give the product of this example.

EXAMPLE 6

*5-chloro-3-(p-chlorophenyl)-7-methyl-2H,8H-benzo-[1,2-e:5,4-e']-bis-[1,2,4]-thiadiazine-1,1,9,9-tetraoxide*

Heat a mixture of 5.0 g. of 6-amino-5-chloro-3-methyl-2H-1,2,4-benzothiadiazine-7-sulfonamide-1,1-dioxide, 5.0 g. of p-chlorobenzoyl chloride and 50 ml. of dimethylformamide on the steam bath for 3 hours. Cool the reaction mixture, dilute with 150 ml. of water and filter off the precipitated 5-chloro-6-(p-chlorobenzamido)-3-methyl-2H - 1,2,4 - benzothiadiazine - 7 - sulfonamide-1,1-dioxide. Melt the latter substance and keep in the molten state for 5 minutes. Cool and recrystallize the residue from dimethylformamide-water to give the product of this example.

EXAMPLE 7

*3-benzyl-5-chloro-2H,8H-benzo-[1,2-e:5,4-e']-bis-[1,2,4]-thiadiazine-1,1,9,9-tetraoxide*

Heat a mixture of 5.0 g. of 6-amino-5-chloro-2H,1,2,4-benzothiadiazine-7-sulfonamide-1,1-dioxide, 5.0 g. of phenylacetyl chloride and 50 ml. of dimethyformamide on the steam bath for 3 hours. Cool the reaction mixture, dilute with 150 ml. of water and filter off the precipitated 5 - chloro-6-($\alpha$-phenylacetamido)-2-H-1,2,4-benzothiadiazine-7-sulfonamide-1,1-dioxide. Melt the latter substance and keep in the molten state for 5 minutes. Cool and recrystallize the residue from dimethylformamide-water to give the product of this example.

EXAMPLE 8

*5-chloro-2H,8H-benzo-[1,2-e:5,4-e']-bis-[1,2,4]-thiadiazine-1,1,9,9-tetraoxide*

Dissolve 7.1 g. of 5-chloro-4,6-diamino-m-benzene disulfonamide in a hot mixture of 30 ml. of ethyl orthoformate and 75 ml. of 2-methoxyethanol and reflux the resulting solution for 12 hours. Filter the cooled reaction mixture and wash the solid product with methanol and air dry to yield a product of this example.

EXAMPLE 9

*5-methyl-2H,8H-benzo-[1,2-e:5,4-e']-bis-[1,2,4]-thiadiazine-1,1,9,9-tetraoxide*

Heat a mixture of 5.0 g. of 6-amino-5-methyl-2H-1,2,4-benzothiadiazine-7-sulfonamide-1,1-dioxide, 50 ml. of ethyl orthoformate and 150 ml. of 2-methoxyethanol at the reflux temperature of the reaction mixture for 12 hours. Filter the cooled reaction mixture, wash the solid product with methanol, and recrystallize from dimethylformamide to give 5-methyl 2H,8H-benzo-[1,2-e:5,4-e']-bis-[1,2,4]-thiadiazine 1,1,9,9-tetraoxide.

I claim:

1. A compound selected from the group consisting of compounds having the structural formula:

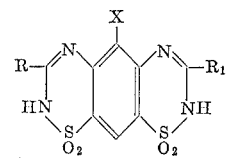

and the non-toxic acid addition salts thereof, wherein X is a member selected from the group consisting of lower alkyl and halogen, and R and $R_1$ each represent a member selected from the group consisting of hydrogen, lower alkyl, phenyl and benzyl.

2. A compound of claim 1 where R and $R_1$ each represent lower alkyl and X represents halogen.

3. A compound of claim 1 wherein R and $R_1$ each represent hydrogen and X represents lower alkyl.

4. A compound of claim 1 wherein R is hydrogen, X is halogen and $R_1$ is lower alkyl.

5. 5 - chloro - 3,7-dimethyl-2H,8H-benzo-[1,2-e:5,4-e']-bis-[1,2,4]-thiadiazine-1,1,9,9-tetraoxide.

6. 5,7 - dimethyl-2H,8H-benzo-[1,2,-e:5,4-e']-bis-[1,2,4]-thiadiazine-1,1,9,9-tetraoxide.

7. 3,5,7 - trimethyl - 2H,8H - benzo-[1,2,-e:5,4-e']-bis-[1,2,4]-thiadiazine-1,1,9,9-tetraoxide.

8. 5 - methyl-3-phenyl-2H,8H-benzo-[1,2-e:5,4-e']-bis-[1,2,4]-thiadiazine-1,1,9,9-tetraoxide.

9. 3 - benzyl - 5-chloro-2H,8H-benzo [1,2-e:5,4-e']-bis-[1,2,4]-thiadiazine-1,1,9,9-tetraoxide.

References Cited by the Examiner

UNITED STATES PATENTS

| | | | |
|---|---|---|---|
| 2,910,475 | 10/1959 | Novello | 260—243 |
| 2,965,656 | 12/1960 | Novello | 260—243 |
| 3,063,995 | 11/1962 | Bernstein et al. | 260—243 |
| 3,103,511 | 9/1963 | Bernstein et al. | 260—243 |
| 3,108,124 | 10/1963 | Close | 260—243 |

WALTER A. MODANCE, *Primary Examiner.*

NICHOLAS S. RIZZO, *Examiner.*